United States Patent [19]

Hartwig

[11] Patent Number: 4,510,265
[45] Date of Patent: Apr. 9, 1985

[54] PLATINUM/SILVER VANADATE CATALYZED DIESEL EXHAUST PARTICULATE FILTER

[75] Inventor: Michael M. Hartwig, Chatham, N.J.

[73] Assignee: Engelhard Corporation, Iselin, N.J.

[21] Appl. No.: 607,048

[22] Filed: May 4, 1984

[51] Int. Cl.³ .......................... B01J 23/64; B01J 23/68
[52] U.S. Cl. ..................... 502/330; 502/527; 423/215.5
[58] Field of Search ............... 502/330, 527; 423/213.5, 215.5

[56] References Cited

U.S. PATENT DOCUMENTS 4,303,552  12/1981  Ernest et al. ................ 502/308

FOREIGN PATENT DOCUMENTS 3141713  5/1983  Fed. Rep. of Germany .

Primary Examiner—W. J. Shine

[57] ABSTRACT

A self-cleaning diesel exhaust particulate filter is disclosed wherein burn-off of collected particulate matter is accomplished at normal exhaust gas temperatures, the filter being provided with a catalyst mixture of a platinum group metal and silver vanadate, the presence of which lowers the temperature at which ignition of the particulate is initiated.

6 Claims, 1 Drawing Figure

PLATINUM/SILVER VANADATE CATALYZED DIESEL EXHAUST PARTICULATE FILTER

BACKGROUND OF THE INVENTION

1. Field of the Invention

This invention relates to diesel engine exhaust gas treatment and more particularly to the filtering of particulates from diesel engine exhaust gases using a catalyzed filter.

2. The Prior Art

The question of how best to reduce the levels of particulate matter expelled to the atmosphere in the exhaust gases of diesel engines is currently of considerable interest. In this connection, it is desired to develop efficient and practical devices for removing substantial portions of particulates from the exhaust gases in diesel engine exhaust systems before permitting the exhaust gases to escape to the atmosphere.

It is known in the art to provide diesel engines with an exhaust filter which traps particulates from the exhaust gas stream during engine operation. The filters are generally made of porous, solid materials having a plurality of pores extending therethrough and having small cross-sectional size, such that the filter is permeable to the exhaust gases which flow through the filters and are capable of restraining most or all of the particulates from passing through the filter with the gas. The restrained particulates consist generally of carbonaceous particulates in the form of soot particles. As the mass of collected particulates increases, the flow rate of the exhaust gas through the filter is usually impeded, whereby an increased back pressure is encountered within the filter and reduced engine efficiency results. At this point, the filter is either discarded as a disposable/replaceable element or removed and regenerated by burning the collected particles off at temperatures in excess of 510° C. so that the filter can be reused.

There is a desire in the art to more simply regenerate the particulate filter by continuous burn-off or incineration of the soot particles as they are trapped in the filter. However, experience has shown that in normal diesel engine operation, the temperature in the exhaust system varies substantially under different conditions of engine load and speed and that the temperatures in the filter only occasionaly reaches the 510° C. temperature level required to incinerate the trapped particulate.

The art, e.g., West German Disclosure Publication DE No. 3141713 published May 11, 1983, has attempted to rectify this situation by the use of a filter which embodies a catalytic material which lowers the ignition temperature of the soot particles exposed to the hot exhaust gas stream, the catalyst being composed of silver vanadate on a transition metal oxide carrier such as aluminum oxide, silicon dioxide, titanium dioxide, zirconium dioxide and oxides of rare earth metals. U.S. Pat. No. 4,303,552 teaches a diesel exhaust catalyst comprised of a bulk catalytic material consisting of an element of the first transition series, silver or hafnium, and a noble metal catalyst e.g. platinum, palladium or chromium supported on a porous refractory inorganic oxide such as α-alumina, magnesia and silica.

There is a need in the art, and it is therefore an object of the present invention, to effect soot particle burn-off in the diesel engine exhaust particulate filter at normal engine operating exhaust gas temperatures.

It is a further object of the invention to provide means whereby the temperature at which soot particles may be incinerated can be lowered to a level more closely approximating the exhaust gas temperatures encountered in normal diesel engine operation whereby burn-off and incineration of the soot particles trapped in the filter may be readily achieved and excessive particulate build-up in the filter avoided without risk of damage to the filter.

SUMMARY OF THE INVENTION

These and other objects of the present invention are obtained by means of a filter device for use in the exhaust system of a diesel engine, wherein a filter element is provided with a catalyst mixture of a platinum group metal and silver vanadate. The presence of the catalyst mixture in the filter lowers the temperature at which ignition and incineration of the particulates collected on the filter walls may be effected so that continuous self-cleaning or regeneration of the filter is accomplished at diesel exhaust gas temperatures encountered under normal diesel engine operating conditions whereby particulate plugging is avoided.

BRIEF DESCRIPTION OF THE DRAWINGS

The present invention may be understood and will hereinafter be explained with reference to the graphs in the FIGURE, the bars of which show data plotted from simulated diesel engine tests indicating the exhaust gas temperatures at which occurs 20%, 50% and 80% removal of the soot deposited on a Pt/silver vanadate catalyzed exhaust particulate filter prepared in accordance with the present invention, and for comparison purposes, the temperatures at which soot removal occurs with a prior art silver vanadate catalyzed particulate filter, a Pt/MgO catalyzed filter and an uncatalyzed filter. From the FIGURE, it is seen that by using a Pt/silver vanadate catalyzed particulate filter in accordance with the present invention, soot removal can be generally effected at lower temperatures when compared to a silver vanadate catalyzed particualte filter, a filter catalyzed with a Pt/MgO combination or an uncatalyzed filter.

DETAILED DESCRIPTION OF THE INVENTION

Figure 1:
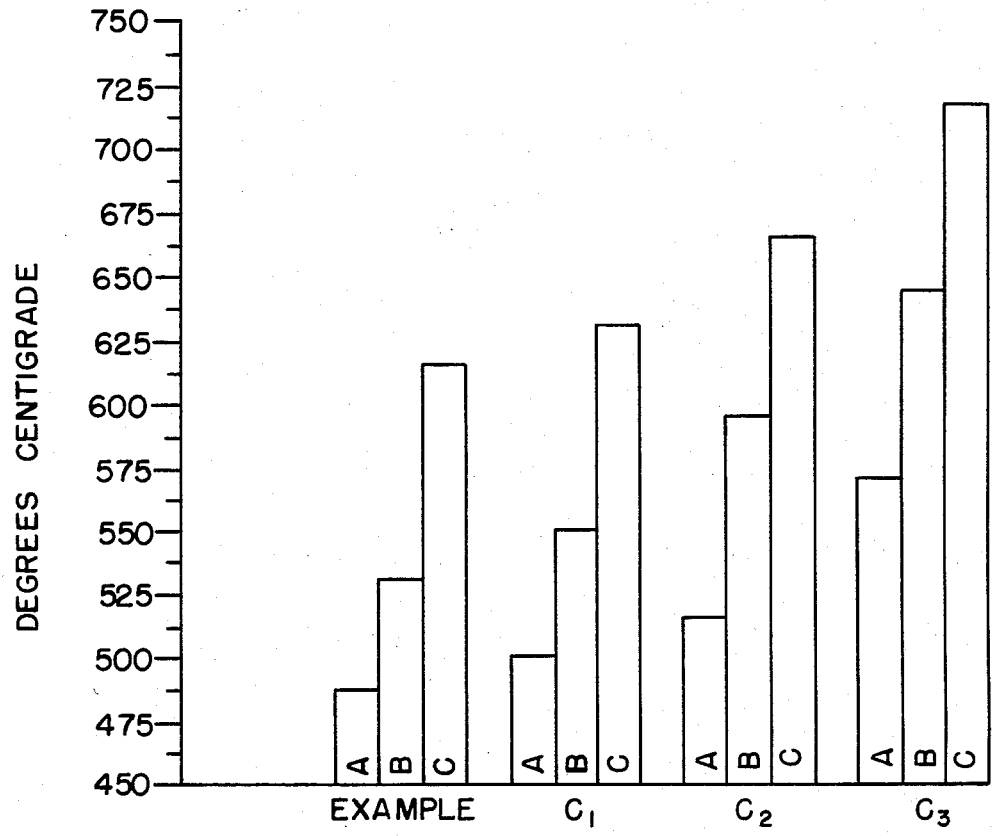

In the practice of the present invention, the Pt/silver vanadate catalyzed filter is placed in the filter housing mounted in the exhaust gas handling system of a diesel engine which includes an exhaust manifold. The filter and filter housing are placed, along with any other exhaust gas line elements which may be present, between the exhaust gas manifold of the engine and the end of the exhaust tailpipe which is open to the atmosphere, but preferably as close as possible to the engine exhaust manifold to benefit from the higher temperature. Within the filter housing is placed the high efficiency, selfregenerating, Pt/silver vanadate catalyzed filter element of the present invention which is adapted to collect particulates in the exhaust gases delivered to the filter housing from the engine manifold. The filter element may be formed of any porous high temperature material which is configured to trap and hold substantial quantities of particulates from the diesel engine exhaust gases without creating an excessive restriction to exhaust gas flow and able to withstand the elevated temperatures encountered in exhaust gases during engine operation.

Filter elements which are mounted in the filter housing for filtering diesel engine exhaust particulates include thin, porous-walled honeycomb (monolith) or foam structures through which the exhaust gases pass without causing too great an increase of backpressure or pressure drop across the filter housing. Normally the presence of a clean filter element will create a backpressure or pressure differential of 10 to 100 millibar which does not materially affect the operating efficiency of the diesel engine. These filters are generally fabricated from ceramics, generally crystalline, glass ceramics, glasses, metals, cermets, resins or organic polymers, papers, textile fabrics (with or without fillers) and combinations thereof. A detailed description of the variety of prior art diesel engine exhaust particulate filters which may be catalyzed in accordance with the practice of the present invention is disclosed in U.S. Pat. No. 4,329,162, the disclosure of which is herein incorporated by reference.

In operation, exhaust gases emitted by the diesel engine are passed from the exhaust manifold through the exhaust pipe and the exhaust particulate filter housing wherein is mounted the catalyzed exhaust filter of the present invention. Within the filter, when the engine is cold or at low vehicle speeds, the exhaust gases pass through the porous walls where substantial portions of the particulates contained in the gases are collected on the catalyzed surfaces of the porous filter medium. At exhaust gas temperatures of about 400°-500° C., which temperatures are reached at general operating speeds under normal loads in a typical diesel passenger automobile, the particulate collected on the walls of the filter are ignited and the collected particulate is continuously incinerated at these exhaust temperatures. The cleaned exhaust gas then passes out of the filter to the remaining portions of the exhaust system from which it escapes to the atmosphere.

The catalyst of the present invention is characterized by a mixture of a platinum group metal such as platinum, palladium, rhodium and ruthenium and silver vanadate with a weight ratio between the platinum group metal and the silver vanadate of about 1:4 to about 1:2000 and preferably about 1:20 to about 1:400.

Platinum is the preferred platinum group metal component of the catalyst mixture of the present invention.

In preparing the catalyzed particulate filters of the present invention, the catalyst may be present in the form of a coating or film layer consisting of the mixture of platinum group metal and silver vanadate at a coating weight or concentration of about 100.5 to about 1025 grams per cubic foot ($g/ft^3$) of unit filter volume of which about 0.5 to about 25 $g/ft^3$ is comprised of the platinum group metal and preferably about 2 to about 15 $g/ft^3$ and about 100 to about 1000 $g/ft^3$ and preferably about 300 to about 800 $g/ft^3$ of the silver vanadate.

Depositing the catalyst mixture of the present invention on the porous walls of a filter element such as a monolithic ceramic material or a foam ceramic material can be carried out in any conventional manner. A preferred method of depositing the catalyst mixture on the surfaces of the filter element walls is to impregnate the filter element with an aqueous suspension of the silver vanadate impregnated with a salt of the platinum group. This is best accomplished by bringing the filter element into contact with an aqueous solution or suspension of either the platinum group metal salt or silver vanadate or both by pouring the solution or suspension into the channels of the filter element, removing excess diluent by draining and subsequent drying at 80°-150° C. followed by calcining at 250°-600° C.

The present invention is illustrated by the following Example:

EXAMPLE

A series of Corning diesel particulate filter elements of 5.6 inch diameter and 6.0 inch length (150.96 $in^3$ volume) having a ceramic cordierite monolith structure of 10-40 micron pore size range, 200 $cell/in^2$ cell density and a 25 mil wall thickness was selected for catalyst treatment in the following manner:

355.7 grams of sodium vanadate ($NaVO_3.4H_2O$) were dissolved in 3.2 liters deionized water, heated to 75° C. and then 271.2 grams $AgNO_3$ in 250 cc water was slowly added with stirring. Orange colored silver monovanadate immediately precipitated. The precipitate was washed, filtered and then dried at 80° C.

129 g of the silver monovanadate obtained above was impregnated, to incipient wetness, with an aqueous salt of a platinum group metal containing 1.91 g of platinum metal. The mixture was stirred for 5 minutes. 5 ml of actic acid was then added, and the mixture stirred for an additional 5 minutes. The platinum impregnated silver monovanadate was then washed with a total of 1378 g $H_2O$ filtered by suction and dried at 110° C.

The platinum impregnated silver monovanadate obtained above was suspended in 400 ml $H_2O$ and ball milled for 15 hours. The ball milled platinum impregnated silver monovanadate was diluted to 1.5 liter with deionized water. The resulting suspension was then poured into the channels of the filter element, excess slurry was removed from the filter element. The filter element was calcined at 300° C. for 3 hours. The cooled filter element was determined to contain 9.7 $g/ft^3$ platinum and 657 $g/ft^3$ silver vanadate. The so catalyzed filter element was weighed and then placed in a filter housing exposed to the exhaust stream of a Daimler-Benz diesel engine. After a back pressure of 0.7 bar had built up in the exhaust gas stream, the filter elements were weight and then placed in reactors heated to different temperatures, e.g. 500° C., 550° C., and 635° C. The weight loss in the filter element was then determined. These data are recorded in The FIGURE as the temperature at which 20% (A) 50% (B) and 80% (C) of the captured soot was burned off the particulate filter.

For the purposes of comparison, the procedure of the Example was repeated with the exception that the temperatures at which 20%, 50%, and 80% soot removal was obtained for a ceramic monolith filter element which had been catalyzed, with 589 $g/ft^3$ silver vanadate designated by the symbol "$C_1$", a ceramic monolith filter which had been catalyzed with a combination of platinum and magnesium oxide (designated by the symbol "$C_2$") the amount of Pt catalyst present on the filter being about 50 $g/ft^3$ and a filter element that had not been catalyzed, designated "$C_3$". The temperature data for filters $C_1$, $C_2$ and $C_3$ are also recorded in the FIGURE.

The FIGURE shows a graph wherein the temperatures at which 20%, 50% and 80% of the soot deposited on the particulate filters is burned off is plotted on the vertical axis. The bars are plotted from actual data. The FIGURE illustrates graphically that by using a Pt/silver vanadate filter element, burn-off of the soot had occurred at lower temperatures when compared to the silver vanadate catalyzed filter element ($C_1$) or the filter element catalyzed with a platinum/MgO catalyst ($C_2$) or the uncatalyzed filter element ($C_3$).

While specific components of the present system are defined above, many other variables may be introduced which may in any way affect, enhance or otherwise improve the system of the present invention. These are intended to be included herein.

Although variations are shown in the present application, many modifications and ramifications will occur to those skilled in the art upon a reading of the present disclosure. These, too, are intended to be included herein.

I claim:

1. A diesel exhaust particulate filter comprising a high temperature resistant filter element having porous walls adapted to filter particulates present in the exhaust gases of diesel engines and collect the particulates from the gases flowed through the element on the surfaces of the porous walls, the surfaces of the walls having been first provided with a catalyst comprised of a mixture of a platinum group metal and silver vanadate, which catalyst mixture lowers the temperature at which the collected particulates are ignited and combustion thereof initiated, whereby the particulates are continuously removed by burning at the temperature of the exhaust gases with relatively high efficiency and low pressure drop.

2. The filter as defined in claim 1 wherein the filter is formed of a ceramic material.

3. The filter as defined in claim 2 wherein the filter is formed of a ceramic monolithic material.

4. The filter as defined in claim 1 wherein the platinum group metal is platinum.

5. The filter as defined in claim 4 wherein the platinum metal is present on the surface of the filter at a concentration of about 0.5 to about 25 grams per square foot of filter surface.

6. The filter as defined in claim 4 wherein the silver vanadate is present on the surface of the filter at a concentration of about 100 to about 1000 grams per square foot of filter surface.

* * * * *

UNITED STATES PATENT AND TRADEMARK OFFICE
CERTIFICATE OF CORRECTION

PATENT NO. : 4,510,265
DATED : April 9, 1985
INVENTOR(S) : HARTWIG

It is certified that error appears in the above-identified patent and that said Letters Patent are hereby corrected as shown below:

Column 6, lines 15-16: change "square foot of filter surface" to --cubic feet of unit filter volume--.

Column 6, lines 19-20: change "square foot of filter surface" to --cubic feet of unit filter volume--.

Signed and Sealed this

Nineteenth Day of November 1985

[SEAL]

Attest:

DONALD J. QUIGG

Attesting Officer

Commissioner of Patents and Trademarks